United States Patent
Lim et al.

(10) Patent No.: US 9,840,114 B2
(45) Date of Patent: Dec. 12, 2017

(54) PNEUMATIC RADIAL TIRE FOR A PASSENGER CAR HAVING ULTRA FINE STEEL CORDS FOR A CARCASS PLY

(71) Applicant: KUMHO TIRE CO., INC., Gwangju (KR)

(72) Inventors: Dong-Min Lim, Gyeonggi-do (KR); Cheul-Ho Choi, Gyeonggi-do (KR)

(73) Assignee: Kumho Tire Co., Inc., Gwangju (KR)

( * ) Notice: Subject to any disclaimer, the term of this patent is extended or adjusted under 35 U.S.C. 154(b) by 289 days.

(21) Appl. No.: 14/671,641

(22) Filed: Mar. 27, 2015

(65) Prior Publication Data

US 2016/0082776 A1    Mar. 24, 2016

(30) Foreign Application Priority Data

Sep. 23, 2014  (KR) ........................ 10-2014-0126972

(51) Int. Cl.
| | |
|---|---|
| *B60C 9/02* | (2006.01) |
| *B60C 9/08* | (2006.01) |
| *B60C 15/00* | (2006.01) |
| *B60C 9/00* | (2006.01) |
| B60C 9/04 | (2006.01) |

(52) U.S. Cl.
CPC .............. *B60C 9/0007* (2013.01); *B60C 9/08* (2013.01); *B60C 2009/0071* (2013.01); *B60C 2009/045* (2013.01); *B60C 2009/0416* (2013.01); *B60C 2009/0425* (2013.01); *B60C 2015/009* (2013.01)

(58) Field of Classification Search
CPC .......... B60C 9/0007; B60C 2009/0071; B60C 2009/0078; B60C 2009/0085; B60C 2009/0092; B60C 9/02; B60C 9/0238; B60C 2009/0246; B60C 2009/0416; B60C 2009/0425; B60C 2009/0433; B60C 2009/045; B60C 2009/0458; B60C 2009/0466; B60C 2009/0483; B60C 9/08; B60C 15/00; B60C 15/0009; B60C 15/0027; B60C 15/0054; B60C 2015/009
USPC ........................................ 152/548, 552, 556
See application file for complete search history.

(56) References Cited

U.S. PATENT DOCUMENTS

| | | | | |
|---|---|---|---|---|
| 8,146,339 | B2 * | 4/2012 | Hayashi | B60C 9/0007 57/236 |
| 2005/0133140 | A1 * | 6/2005 | Lee | B60C 9/0007 152/556 |
| 2007/0102091 | A1 * | 5/2007 | Maruoka | B60C 15/0027 152/541 |

FOREIGN PATENT DOCUMENTS

| | | |
|---|---|---|
| KR | 20-1999-0003092 | 1/1999 |
| KR | 10-0346067 B1 | 7/2002 |
| KR | 10-2005-0063863 A | 6/2005 |

* cited by examiner

*Primary Examiner* — Eric Hug
(74) *Attorney, Agent, or Firm* — Baker Hostetler LLP

(57) ABSTRACT

Disclosed is a pneumatic radial tire for a passenger car having ultra fine steel cords for a carcass ply in which adhesive force between a carcass ply layer and a side wall or a rim flange rubber adjacent to a turn up portion on an outside and a stiffness of the rim flange rubber are larger than a bending stiffness of the carcass ply layer so as to improve durability of a bead part while reducing poor air inletting generated at a carcass turn up portion.

3 Claims, 2 Drawing Sheets

PNEUMATIC RADIAL TIRE FOR A PASSENGER CAR HAVING ULTRA FINE STEEL CORDS FOR A CARCASS PLY

CROSS-REFERENCE TO RELATED APPLICATIONS

This application claims priority to Korean Patent Application No. 10-2014-0126972, filed on Sep. 23, 2014 in the Korean Intellectual Property Office, the entire disclosure of which is incorporated herein by reference.

BACKGROUND OF THE INVENTION

Field of the Invention

The present invention relates to a pneumatic radial tire for a passenger car having ultra fine steel cords for a carcass ply, and more specifically to a pneumatic radial tire for a passenger car having ultra fine steel cords for a carcass ply which is capable of improving durability of a bead part while reducing air leakage generated at a carcass turn up portion.

Description of the Related Art

A pneumatic radial tire for a passenger car includes an inner liner rubber layer for preventing air injected therein from being leaked, and one or two carcass ply layers which are made of a material such as polyester, rayon, or nylon, etc., and disposed on the inner liner rubber layer. Further, the pneumatic radial tire includes carcass ply turn up portions formed by turning up an annular bead bundle on the carcass plies, belt plies formed by reinforcing an outside of the carcass plies in a tread portion with organic fiber cords such as one to four steel cords or aramid, a tread rubber covered on the belt plies, and a bead part formed by reinforcing both outer sides of the carcass plies with a bead reinforcing filler, a rim flange, and a chafer strip made of nylon or steel.

The carcass ply used in a conventional pneumatic radial tire often effectively uses a polyester cord having a strength and cost suitable for manufacturing the tire. Recently, according to an improvement in vehicle performance and an increase in high-speed driving roads, excellent ride comfort, steering stability, and durability for high-speed driving are required in tires, and a demand for high performance tires has been increased. As a material of the carcass ply of a tire, a rayon cord having a high modulus and minimal change in thermal properties of the tire cord may be effectively used with regards to the design of the tire. However, since the rayon cord has a low breaking strength, in order to maintain the durability of the tire, diameters of the cord and a rubber or the number of the plies should be increased, and thereby a weight of the tire is inevitably increased. Specifically, in a recent tendency to focus on the fuel efficiency, there is an attempt to reduce a rolling resistance of the tire by decreasing the weight of the tire. Under such a trend, the rayon cord has limitations in design such that reducing the weight of the carcass ply layer is difficult.

In comparison with rayon cord, steel cord shows high modulus and no physical changes in thermal and moisture properties. Therefore, if the steel cord is used as a material for reinforcing the carcass ply, it is possible to improve the performances relating to steering, flat spot, ride comfort, etc. of the pneumatic radial tire for a passenger car, and fuel efficiency by decreasing the weight of the carcass ply layer. However, a conventional steel cord has a large wire diameter of 0.15 mm or more. Thereby, it is difficult or impossible to turn up the carcass ply through the bead bundle in a turning up process of the tire forming. Also, since the bead portion should be reinforced by increasing a thickness of a side wall or a rubber of the rim flange because of the high tension ply applied to the bead portion, there are limitations in design such as an increase in the weight of the tire even if the tire is manufactured.

In order to solve the above-described problems, Korean Utility-Model Application No. 1997-0016686 (1997, Jun. 30) discloses an ultra fine steel cord for a carcass ply, which has a wire diameter of 0.04 to 0.14 mm forming the steel cord, and Korean Patent Laid-Open Publication No. 10-2005-0063863 (2005, Jun. 29) discloses a pneumatic radial tire having steel cords for a carcass ply which includes one strand of steel core wire, and four to seven strands of steel side wires, and has a technical characteristic in that the side wires are spirally wound around an outer peripheral surface of the core wire in an axial direction thereof and have a smaller wire diameter of 0.04 to 0.14 mm than the core wire, so that the steel cord has a final diameter of 0.2 to 0.5 mm and a breaking strength of 25 to 35 kgf after finally being twined together. The tires applying the conventional technique have many benefits in performance such as improved steering stability due to high sidewall stiffness, improved ride comfort due to an excellent uniformity of the tire in an aspect of bulges or dents, and the like. Further, since the physical properties of the cord are not changed even if the temperature of the tire is increased by heat generated during driving, performance of the tire is not reduced even if driving for a long period of time.

However, according to the design tendency to favor steering stability, a structure of the tire is changed to have a wide tread width, a large rim diameter, and a low aspect ratio of the tire, and as a result, tires having a carcass reinforcing layer of ultra fine steel cords have been developed. However, these tires have problems such as a manufacturing defect due to detaching of the carcass turn up portion during the forming and curing processes, and when a tire has a low turn up height of the carcass ply, the detaching problem becomes more frequent. In this case, since bead durability of the tire is rapidly reduced, a tire having a structure in which the turn up height of the carcass ply is decreased due to a low aspect ratio thereof is limited to the use of the ultra fine steel cords as a reinforcing material of the carcass ply. For example, Korean Patent Registration No. 10-0346067 discloses a steel tire cord with improved corrosion resistance and a manufacturing method thereof.

SUMMARY OF THE INVENTION

In consideration of the above-described circumstances, it is an object of the present invention to provide a pneumatic radial tire for a passenger car having ultra fine steel cords for a carcass ply, in which, by preventing an occurrence of a carcass ply detaching in a carcass turn up portion, in a tire using steel cords made of ultra fine wires having a small wire diameter as a reinforcing material of the carcass ply, ultra fine steel cord plies may be used even if the tire has a low aspect ratio, as well as by designing the tire so as to satisfy a relation between a bending strength of the carcass ply, an adhesive force of the ultra fine ply, and a stiffness of a rim flange rubber, ultimately, bead durability may improved, while increasing performances of the tire such as steering stability.

In order to accomplish the object, according to an aspect of the present invention, there is provided a pneumatic radial tire for a passenger car which uses ultra fine steel cords having a wire diameter of 0.14 mm or less as a reinforcing material of a carcass ply, wherein a bending force of the carcass ply with ultra fine steel cord Fp satisfies a relation equation below between a turn up height of the carcass ply h, tensile strength of the rim flange rubber $M_{RF}$, and a thickness of the rim flange rubber t.

$$0 < F_P < (0.025 \times h) + (M_{RF} \times t)$$

The bending force of the carcass ply with ultra fine steel cord $F_P$ may be larger than a bending force of carcass ply $F_{pf}$ made of an organic fiber.

The ultra fine steel cord may have a wire diameter of 0.04 to 0.14 mm, and a breaking force of 25 to 35 kgf.

According to the present invention, when designing a product so as to satisfy the relation equation of the present invention between the adhesive force of ultra fine steel cord and the carcass covering rubber and the tensile strength of the rim flange rubber, it is possible to use the carcass ply with ultra fine steel cords for a carcass ply without a process problem due to the detaching of the carcass ply even if the tire has a low aspect ratio, and improve overall performances such steering stability, ride comfort, or the like in the tire using the same. That is, if the bending force of the carcass ply with ultra fine steel cord for a carcass ply is reduced by decreasing the wire diameter of the ultra fine steel cords, it is possible to proportionally reduce the turn up height of the carcass ply or the thickness of the rim flange rubber. In this regard, it is possible to design the tire without detaching of the carcass ply or reducing of bead durability while decreasing the weight of the tire.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
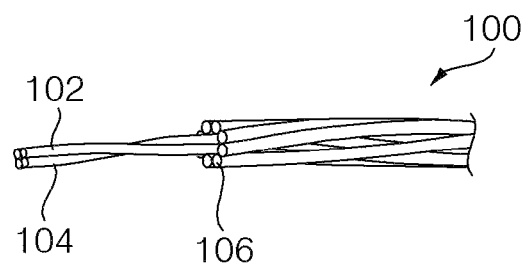
FIG. 1 is a partial perspective view illustrating an ultra fine steel cord according to an example of the present invention.

Hereinafter, preferable embodiments of the present invention will be described with reference to the accompanying drawings. Referring to the drawings, wherein like reference characters designate like or corresponding parts throughout the several views. In the embodiments of the present invention, a detailed description of publicly known functions and configurations that are judged to be able to make the purport of the present invention unnecessarily obscure will be omitted.

According to the present invention, in order to solve problems such as detaching of the carcass ply after a carcass ply turning up process of the tire forming, or decreasing of the bead durability, a method of designing a product so as to have a higher adhesive force of the ultra fine steel cord for a carcass ply and a higher strength of the rim flange rubber than the bending force of the carcass ply with ultra fine steel cords is proposed. Accordingly, a relation as represented in Equation 1 below will be established.

$$F_P < F_A + F_R \quad \text{[Equation 1]}$$

Wherein, $F_P$ denotes the bending force of the carcass ply with ultra fine steel cords, $F_A$ denotes the adhesive force of the carcass ply with ultra fine steel cords, and $F_R$ denotes the strength of the rim flange rubber.

The bending force of the carcass ply with ultra fine steel cords $F_P$ is proportional to the bending force of the ultra fine steel cord $F_S$ and the number of the cords N, and a bending force of the steel cord $F_S$ is determined by the number of the wires n and a wire diameter d as represented in Equation 2 below.

$$F_P = N \times F_S = N \times 2400(n \times d^4) \quad \text{[Equation 2]}$$

Herein, the strength of the steel cord is proportional to Young's modulus, a twisted angle of the wire, and the number of the wire n, and proportional to the fourth power of the wire diameter d (proportional to a sectional moment of the wire). Equation 2 is an equation in which all parameters other than the number of the wire and the wire diameter are simplified to a constant.

An adhesive force of the carcass ply with ultra fine steel cords $F_A$ and the strength of the rim flange rubber $F_R$ have a relation with a turn up height of the carcass ply h, a tensile strength of the rim flange rubber $M_{RF}$ at the time of 50% elongation, and a thickness of the rim flange rubber t as represented in Equations 3 and 4 below.

$$F_A \geq 0.025 \text{ kg}_f/\text{mm} \times h \quad \text{[Equation 3]}$$

Equation 3 is an equation obtained based on experience in tire design, and represents the relation between the adhesive force and the turn up height of the carcass ply as a proportional expression.

$$F_R \geq M_{RF} \times At \quad \text{[Equation 4]}$$

Accordingly, the bending force of the carcass ply with ultra fine steel cords $F_P$ may be represented as Equation 5 below.

$$F_P < (0.025 \text{ kg}_f/\text{mm} \times h) + (M_{RF} \times At) \quad \text{[Equation 5]}$$

If the $F_P$ is zero (0), back tension of the carcass ply becomes zero (0), and it is an ideal state. Of course, since the steel ply is made of a material having a basic inherent stiffness and thickness, in practice, the zero (0) state is not possible. Therefore, Equation 5 may be represented as Equation 6 below.

$$0 < F_P < (0.025 \text{ kgf/mm} \times h) + (M_{RF} \times At) \quad \text{[Equation 6]}$$

Herein, since $F_P = 0$ means that, when turning up the carcass ply, it is maintained in the state without repulsive force, this is the most suitable state. However, since the bending force of the carcass ply with ultra fine steel cords $F_P$ is larger than a bending force of carcass ply $F_{pf}$ made of a conventional organic fiber, the present invention is designed based thereon, and the carcass ply made of the organic fiber may be defined to $F_P$ or more. Accordingly, Equation 6 may be modified as Equation 7 below.

$$F_{pf} < F_P < (0.025 \text{ kg}_f/\text{mm} \times h) + (M_{RF} \times At) \quad \text{[Equation 7]}$$

Hereinafter, a technique of the present invention for using the ultra fine steel cord for a carcass ply in a pneumatic radial tire for a passenger car having a low aspect ratio will be described in detail.

Figure 2:
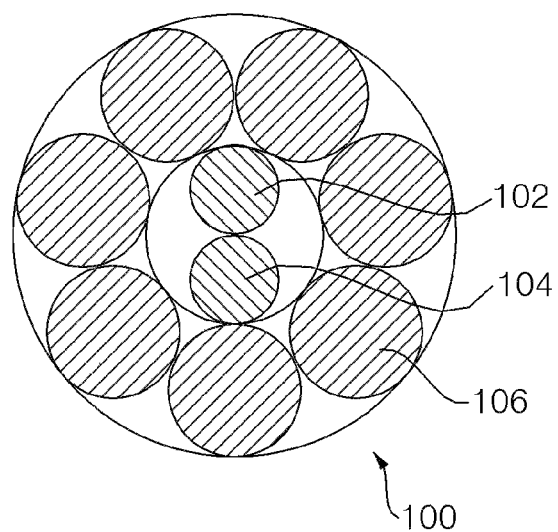
FIG. 2 is a cross-sectional view illustrating the ultra fine steel cord of FIG. 1.
Figure 3:
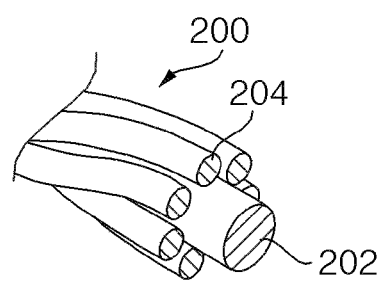
FIG. 3 is a partial perspective view illustrating an ultra fine steel cord of a comparative example described in the present invention.
Figure 4:
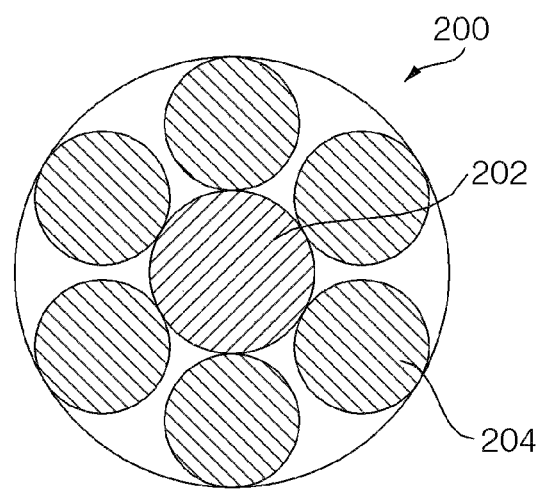
FIG. 4 is a cross-sectional view illustrating the ultra fine steel cord of FIG. 3.

An ultra fine steel cord 100 used in an example according to the present invention as a reinforcing material of the carcass ply is formed as illustrated in FIGS. 1 and 2. The ultra fine steel cord 100 includes two core wires 102 and 104 arranged in a central portion thereof, and seven to nine side wires 106 which have a wire diameter of 0.04 to 0.14 mm, and are twisted outside of an imaginary circle formed by the core wires 102 and 104 about the same to form a 2+n structure. Conventionally, since the wire diameter forming the ultra fine steel cord 100 is 0.15 mm or more, an upper value of the range of the wire diameter used in the ultra fine steel cord is limited to 0.14 mm or less, and drawing the steel cord of 0.04 mm or less is impossible by a current technique using a high carbon steel wire, such that a lower value thereof is limited to 0.04 mm or more.

The diameter of the prepared ultra fine steel cord 100 is 0.3 to 0.5 mm, and a breaking force is 25 to 35 kgf. Herein, the breaking force is a strength of the steel cord required for supporting a load in the pneumatic radial tire for a passenger car. The minimum strength of the ultra fine steel cord required for supporting the load should be 25 kgf or more. If the strength thereof exceeds 35 kgf, the strength of the carcass ply is higher than necessary, and it may be an excessive design.

However, the ultra fine steel cord 100 may have, for example, a structure of 1+n, m+n, l+m+n, etc., without particular limitation thereof. That is, various types of ultra fine steel cord structure may be used within a range of the strength and bending stress of the carcass ply, without particular limitation thereof.

Table 1 illustrates a comparison of physical properties and durability of a prototype tire between 2+7×0.095 (two core wires and seven side wires having a wire diameter of 0.095 mm, respectively) which is the ultra fine steel cord 100 according to the example of the present invention and a conventional ultra fine steel cord 200 which is a comparative example.

The prototype product using the carcass ply with ultra fine steel cord was evaluated with a tire size of 245/40 R18, and a prototype tire having a turn up height of the carcass ply and a thickness of the rim flange was manufactured according to the present invention.

In case of the bending force of the carcass ply with ultra fine steel cord, both ends of the carcass ply were mounted on a support, and a central portion thereof was pressed downward, and then a force applied to the carcass ply was measured. In case of the adhesive force of the carcass ply, after the adjacent carcass ply and a rubber sheet were adhered to each other by applying a constant force, a force necessary to detach the same was measured. Then, the performances of the product were evaluated in terms of belt and bead durabilities, and vehicle driving emotion (ride comfort and steering stability).

As a result of evaluation, it can be seen that the example using the 2+7×0.095 ultra fine steel cord having a small wire diameter as the carcass ply in order to reduce the bending force of the ultra fine steel cord 100 may sufficiently secure the durability and other performances of the product even when having a reduced turn up height of the carcass ply and decreased thickness of the rim flange rubber.

However, it can be seen from the evaluated result that, in case of the comparative example using a tire in which the ultra fine steel cord 200 having a structure of 1×0.13+6×0.12 (which uses one core wire 202 with a wire thickness of 0.13 mm and six side wires 206 with a wire thickness of 0.12 mm) as the carcass ply, if the thickness of the rim flange rubber is decreased, the bead durability is decreased by 8%. If the thickness of the rim flange rubber is increased to 2 mm in order to improve the bead durability, the durability as well as the entire driving performances are improved, and thereby it is possible to design the product even if the bending force of the carcass ply is increased due to the improving of the entire driving performances.

TABLE 1

| | Section | Example | Comparative Example |
|---|---|---|---|
| Properties of cord | Steel cord (carcass) | 2 + 7 × 0.095 | 1 × 0.13 + 6 × 0.12 |
| | Cord diameter | 0.37 | 0.33 |
| | Twisted length (direction), mm (S or Z) | 5S/9S | 8S |
| | breaking force kgf | 25.8 | 25.2 |
| | Bending force of carcass ply ($F_P$), kgf | 2.1 | 3.5 |

| Tire evaluation (245/40 R18) | | | | | |
|---|---|---|---|---|---|
| Turn up height of carcass ply (h), mm | | 30 | 60 | 60 | 60 |
| Thickness of rim flange rubber (t), cm | | 0.5 | 0.3 | 0.5 | 0.7 |
| Adhesive force of carcass ply ($F_A$), kgf | | 0.8 | 1.5 | 1.5 | 1.5 |
| Strength of rim flange rubber ($F_R$), kgf | | 1.5 | 0.9 | 1.5 | 2.1 |
| I/D | Belt durability (%) | 100 | 100 | 100 | 100 |
| | Bead durability (%) | 100 | 128 | 92 | 108 |
| F/D | Ride comfort | 100 | 100 | 110 | 110 |
| | Steering stability | 100 | 110 | 110 | 120 |

While the present invention has been described with reference to the preferred embodiments, the present invention is not limited to the above-described embodiments, and it will be understood by those skilled in the related art that various modifications and variations may be made therein without departing from the scope of the present invention as defined by the appended claims.

What is claimed is:

1. A pneumatic radial tire for a passenger car which uses ultra fine steel cords having a wire diameter of 0.14 mm or less as a reinforcing material of a carcass ply,
    wherein a bending force of the carcass ply ($F_P$; kgf) satisfies a relation equation below between a turn up height of the carcass ply (h, mm), a tensile strength of a rim flange rubber ($M_{RF}$; kgf/cm$^2$) at the time of 50% elongation and a unit cross sectional area (At; 1×t cm$^2$) depending on a thickness of rim flange rubber (t):

$$0 < F_P < (0.025 \text{ kgf/mm} \times h) + (M_{RF} \times At).$$

2. The pneumatic radial tire according to claim 1, wherein the bending force of the carcass ply $F_P$ is larger than a bending force of carcass ply $F_{pf}$ made of an organic fiber.

3. The pneumatic radial tire according to claim 1, wherein the ultra fine steel cord has a wire diameter of 0.04 to 0.14 mm, and a breaking force of 25 to 35 kgf.

* * * * *